(12) United States Patent
Chen (10) Patent No.: US 11,233,675 B2
(45) Date of Patent: Jan. 25, 2022

(54) SYSTEM AND METHOD FOR ENABLING COEXISTING HOTSPOT AND DMZ

(71) Applicant: ARRIS Enterprises LLC, Suwanee, GA (US)

(72) Inventor: Jianxiang Chen, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 69 days.

(21) Appl. No.: 15/551,513

(22) PCT Filed: Dec. 19, 2016

(86) PCT No.: PCT/CN2016/110859
§ 371 (c)(1),
(2) Date: Aug. 16, 2017

(87) PCT Pub. No.: WO2018/112716
PCT Pub. Date: Jun. 28, 2018

(65) Prior Publication Data
US 2020/0366523 A1    Nov. 19, 2020

(51) Int. Cl.
*H04L 12/46* (2006.01)
*G06F 21/60* (2013.01)
(Continued)

(52) U.S. Cl.
CPC ........ *H04L 12/4633* (2013.01); *G06F 21/606* (2013.01); *H04L 12/2834* (2013.01);
(Continued)

(58) Field of Classification Search
CPC . H04L 12/4633; H04L 45/74; H04L 61/6022; H04L 12/2834; H04L 12/66; H04L 45/66; G06F 21/606
See application file for complete search history.

(56) References Cited

U.S. PATENT DOCUMENTS 8,130,768 B1   3/2012 Ahrens et al.
2004/0073642 A1* 4/2004 Iyer ............... H04L 29/12311
709/223

(Continued)

FOREIGN PATENT DOCUMENTS

| EP | 2501082 A1 | 9/2012 |
| WO | 2015/062627 A1 | 5/2015 |
| WO | 2016/190912 A1 | 12/2016 |

OTHER PUBLICATIONS

"Software-defined networking for big-data science"; Monga et al.; 2012 SC Companion: High Performance Computing, Networking Storage and Analysis; Nov. 10, 2012 (Year: 2012).*

(Continued)

*Primary Examiner* — Benjamin H Elliott, IV
(74) *Attorney, Agent, or Firm* — Wenderoth, Lind & Ponack, L.L.P.

(57) ABSTRACT

A gateway is provided for use with a DMZ host and a Hotspot client. The gateway includes a communication module and a processing module. The communication module receives a communication packet having a transparent Ethernet bridging generic routing encapsulation header and a payload having a destination MAC address and forwards the communication packet to one of the group consisting of the DMZ host, the Hotspot client, and both of the DMZ host and the Hotspot client. The processing module determines whether the communication packet is a Unicast communication packet or a Multicast communication packet based on the destination MAC address, and instructs the communication module to forward the communication packet to one of the group consisting of the DMZ host, the Hotspot client, and both the DMZ host and the Hotspot client based on the destination MAC address.

20 Claims, 11 Drawing Sheets

(51) Int. Cl.
*H04L 12/28* (2006.01)
*H04L 12/66* (2006.01)
*H04L 12/721* (2013.01)
*H04L 12/741* (2013.01)
*H04L 29/12* (2006.01)

(52) U.S. Cl.
CPC .............. *H04L 12/66* (2013.01); *H04L 45/66* (2013.01); *H04L 45/74* (2013.01); *H04L 61/6022* (2013.01)

(56) References Cited

U.S. PATENT DOCUMENTS

| | | | | |
|---|---|---|---|---|
| 2005/0163079 | A1* | 7/2005 | Taniuchi | H04L 69/161 370/331 |
| 2005/0165953 | A1* | 7/2005 | Oba | H04L 12/5691 709/238 |
| 2011/0145911 | A1* | 6/2011 | O'Brien | H04L 63/0227 726/13 |
| 2015/0280928 | A1* | 10/2015 | Tessmer | H04L 12/4641 370/390 |
| 2016/0094488 | A1* | 3/2016 | Chen | H04L 45/66 370/401 |
| 2017/0208032 | A1* | 7/2017 | Cox | H04L 61/2567 |
| 2017/0230905 | A1* | 8/2017 | Pularikkal | H04W 8/18 |
| 2018/0288614 | A1* | 10/2018 | Zaks | H04W 12/0602 |

OTHER PUBLICATIONS

"Community Wi-Fi White Paper", Wireless Broadband Alliance, Sep. 2014. Web Link: http://www.wballiance.com/resource-center/wba-white-papers/.

PCT International Search Report & Written Opinion, RE: Application No. PCT/CN2016/110859, dated Aug. 30, 2017.

* cited by examiner

--Prior Art--

SYSTEM AND METHOD FOR ENABLING COEXISTING HOTSPOT AND DMZ

BACKGROUND

Embodiments of the invention relate to devices and methods for communication over Transmission Control Protocol/Internet Protocol (TCP/IP) networks.

In computer security a demilitarized zone (DMZ) is a physical or logical subnetwork that contains and exposes a local network's external-facing services to a usually larger and untrusted network, e.g. the Internet. The purpose of the DMZ is to add an additional layer of security to the local network.

A Hotspot is a physical location where people can access the Internet, typically using a wireless local area network.

A gateway connects a local network to a public network. Prior-art embodiments of the gateway do not allow a DMZ and a Hotspot to be operated at the same time.

There exists a need for a system that allows a gateway to simultaneously operate a DMZ host and a Hotspot client.

SUMMARY

Aspects of the present invention are drawn to a gateway for use with a DMZ host and a Hotspot client. The gateway includes a communication module and a processing module. The communication module receives a communication packet having a transparent Ethernet bridging generic routing encapsulation header and a payload having a destination media access control (MAC) address and forwards the communication packet to one of the group consisting of the DMZ host and the Hotspot client. The processing module determines whether the communication packet is a Unicast communication packet or a Multicast communication packet based on the destination MAC address, and instructs the communication module to forward the communication packet to one of the group consisting of the DMZ host and the Hotspot client based on the destination MAC address.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

The present invention provides a device and method to network communication. Aspects of the present invention are drawn to a gateway.

A gateway is typically used in a home environment and is connected to the public Internet on the wide-area network (WAN) side and to a number of hosts on the local-area network (LAN) side. The gateway enables LAN hosts to communicate with each other and to the public Internet, while providing a degree of isolation and security between LAN and WAN.

The gateway may also offer Hotspot and DMZ functions. The Hotspot function creates a publicly-accessible network on the LAN side that is separate from the private hosts that are also attached to the gateway. The DMZ function forwards all traffic not destined for any other LAN host to a specific host, and can be used to provide a resource that is easily accessed by other users on the Internet.

Prior-art embodiments of a gateway are not able to support Hotspot and DMZ functions at the same time. A gateway in accordance with aspects of the present invention provides a system and method that allows operation of a Hotspot client and DMZ host simultaneously.

A data network with a conventional gateway will now be described with reference to FIGS. 1-9.

A typical home network will now be described with reference to FIG. 1.

Figure 1:
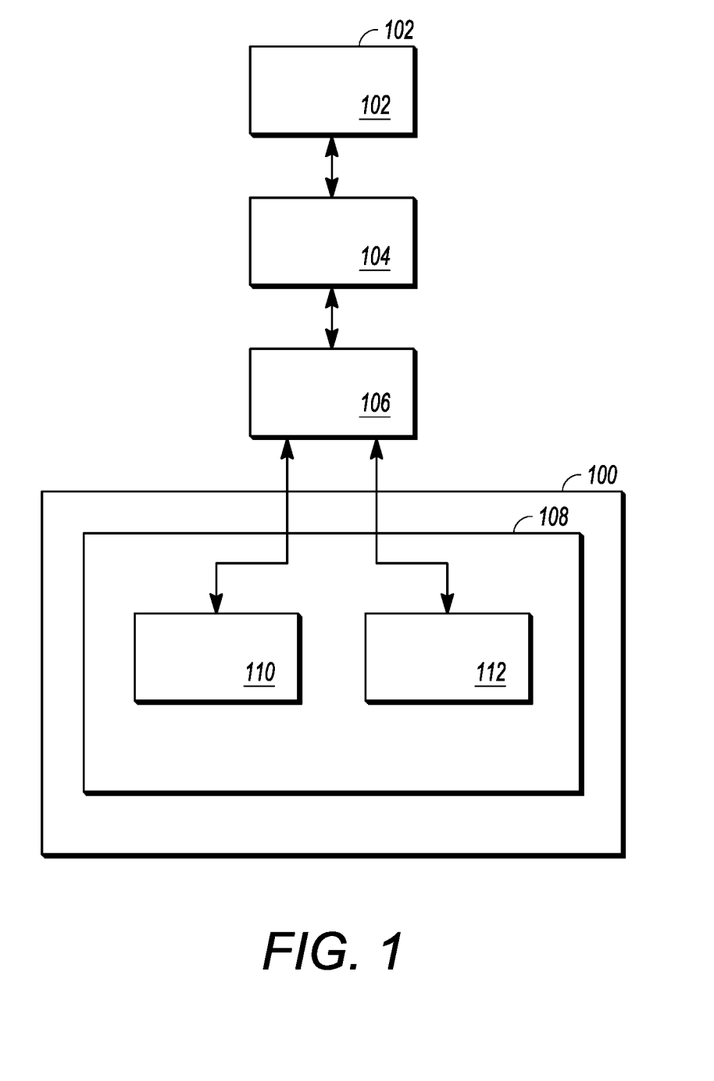
FIG. 1 illustrates a typical home network.

FIG. 1 illustrates a typical home network.

As shown in the figure, a gateway 106 creates a home network 100, which includes a private network 108 containing a host 110 and a host 112. Gateway 106 is connected to a public network 104, typically the Internet.

Public network 104 connects various routers, hosts, servers, and clients, a non-limiting example of which may be the Internet.

Public server 102 may be any device or system that provides content or data resources on public network 104, non-limiting examples of which may be websites for Google or CNN.

Hosts 110 and 112 may be devices or systems that communicate with other devices or systems on private network 108 or public network 104, non-limiting examples of which may be personal computers, printers, smartphones, or gaming consoles.

In this example embodiment, gateway 106 is connected to two hosts. In other embodiments, gateway 106 may be connected to any number of hosts.

Gateway 106 may be any device or system that provides physical and logical connections between public network 104 and private network 108 and routes data packets between host 110, host 112, and public server 102. Gateway 106 isolates private network 108 from public network 104 and, for example, prevents public server 102 from accessing host 110 without permission. A non-limiting example of gateway 106 is a combination cable modem/WiFi router.

Private network 108 connects various hosts, servers, and clients, non-limiting examples of which may be home WiFi or home Ethernet networks.

In operation, a user working on host 110 can browse content on public server 102 by opening a Web browser and entering the appropriate URL of public server 102. Host 110 establishes a session with public server 102 wherein information is exchanged. The flow of information is bi-directional and includes many types of data such as authentication and content. Gateway 106 ensures that data packets flow on the correct route between host 110 and public server 102.

A more detailed discussion of data packets will now be described with reference to FIG. 2.

Figure 2:
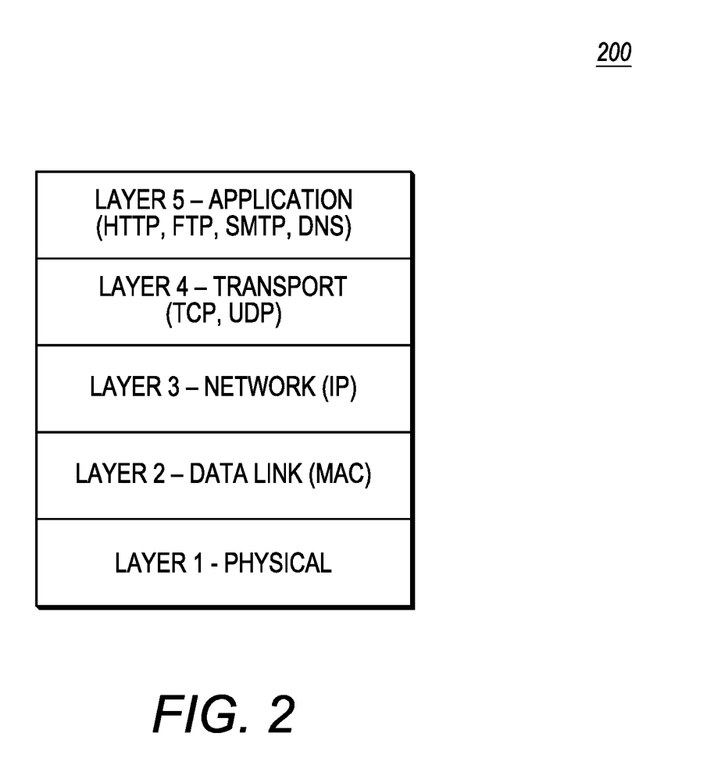
FIG. 2 illustrates a data model of a TCP/IP packet.

FIG. 2 illustrates a data model of a TCP/IP packet 202.

TCP/IP packet 202 is a data packet using the TCP/IP protocol, which is used by the most prevalent embodiment of public network 104.

TCP/IP packet 202 comprises 5 layers. Layer 1 is the Physical layer and describes the physical properties of a connection between two nodes in the network; non-limiting examples of Layer 1 include electrical impulses on an Ethernet cable, radio signals on WiFi, or optical pulses on a fiber optic cable. Layer 2 is the Data Link layer and describes the unique addresses assigned to nodes in the network; a non-limiting example of a Layer 2 address includes a MAC address. Layer 3 is the Network layer and establishes connections across network boundaries that are independent of the underlying network topology; a non-limiting example of a Layer 3 address includes an IP address. Layer 4 is the Transport layer, which performs host-to-host communications between directly-connected hosts or through routers. Layer 4 is responsible for specifying unreliable versus reliable service, flow-control, and timeouts. Non-limiting examples of Layer 4 services include transmission control protocol TCP or user datagram protocol (UDP). Layer 5 is the Application layer, which carries what are commonly regarded as Internet services; non-limiting examples of Layer 5 services include hypertext transfer protocol (HTTP) for Web browsing, domain name servers (DNS) to reconcile domain names to IP addresses, and file transfer protocol (FTP) for transferring files.

Returning to FIG. 1, when host 110 wants to send a packet to host 112, host 110 creates a packet with 2 IP addresses: a source IP address of host 110 and a destination IP address of host 112. The packet also has 2 MAC addresses: the source MAC address of host 110 and the destination MAC address of gateway 106. The packet is sent from host 110 to gateway 106. Gateway 106 examines the destination MAC address, finds the port corresponding to this destination MAC address using a database stored in gateway 106, then forwards the packet to host 112.

When host 110 wants to send a packet to public server 102, host 110 creates a packet with 2 IP addresses: a source IP address of host 110 and a destination IP address of host 102. The packet also has 2 MAC addresses: the source MAC address of host 110 and the destination MAC address of gateway 106. Gateway 106 receives this packet; since server 102 is outside private network 108, gateway 106 sends the packet into public network 104 by substituting the packet's destination MAC address with the MAC address of the next router in public network 104. Each router forwards the packet in a similar manner until the packet arrives at public server 102, which corresponds with the destination IP address of the packet.

Gateway 106 also has the function of hiding hosts in private network 108 from hosts in public network 104. Public server 102 does not know the MAC and IP addresses of host 110; instead, these are translated by gateway 106 using information it has already learned when host 110 was initially connected. When public server 102 wants to send a packet to host 110, it creates a packet with 2 IP addresses: a source IP address of public server 102 and a destination IP address of gateway 106. When the packet reaches gateway 106, gateway 106 examines Layer 3 and Layer 4 of the packet; gateway 106 matches this information with a connection database stored in gateway 106 and forwards the packet to host 110.

If gateway 106 receives a packet that is destined for neither host 110 nor host 112, gateway 106 discards this packet. An alternative method of handling this type of packet will now be discussed with reference to FIG. 3.

Figure 3:
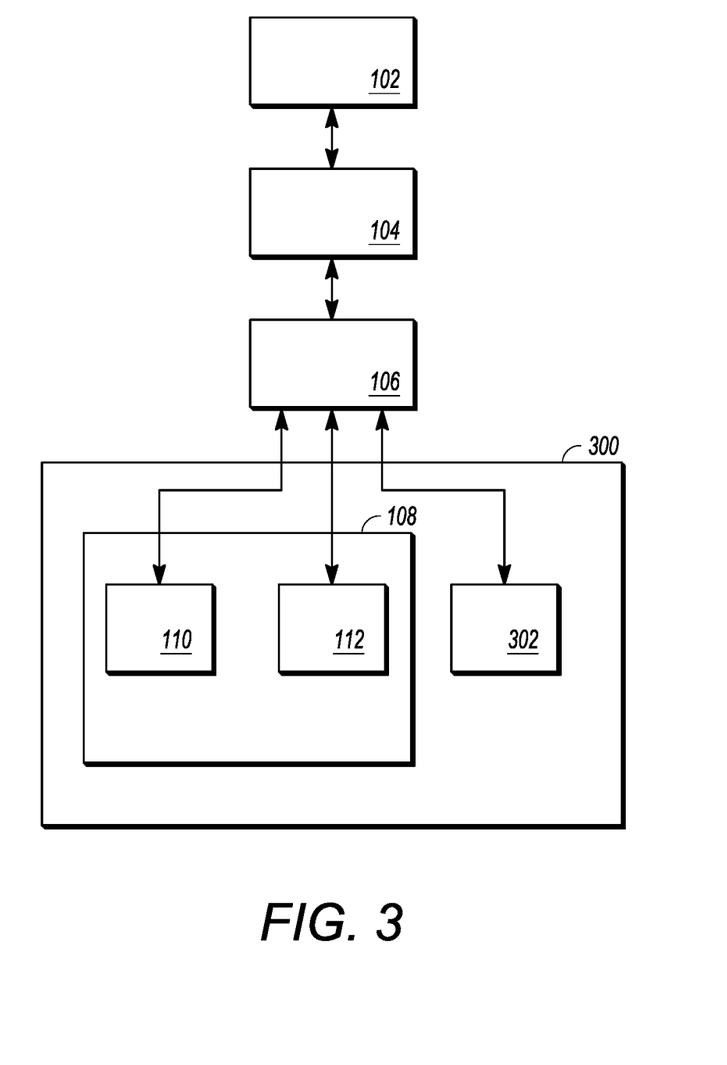
FIG. 3 illustrates a home network with a DMZ host.

FIG. 3 illustrates a home network 300 with a DMZ host 302, wherein DMZ host 302 is connected to gateway 106.

DMZ host 302 may be any device or system that has data packets sent to it which are not otherwise forwarded to the other hosts in private network 108. DMZ host 302 may access hosts 110 and 112, and vice-versa. Non-limiting examples of DMZ host 302 include computers running Web server software to provide content to clients in public network 104, or gaming consoles running multiplayer games with other players in public network 104.

Gateway 106 may also be configured to support a public Hotspot, which will now be discussed with reference to FIG. 4.

Figure 4:
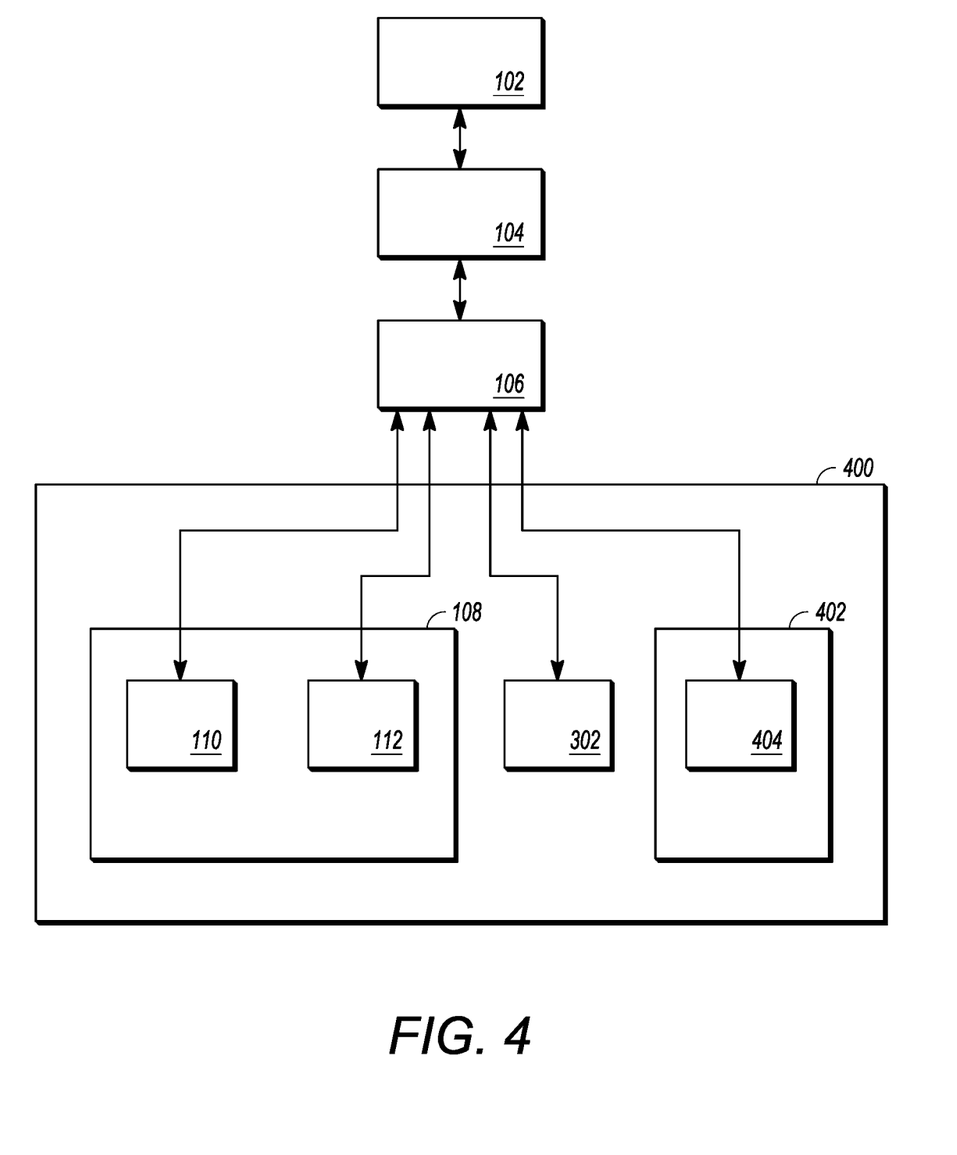
FIG. 4 illustrates a home network with a DMZ host and a Hotspot client.

FIG. 4 illustrates a home network 400 with DMZ host 302, a Hotspot network 402, and a Hotspot client 404.

As shown in the figure, gateway 106 creates Hotspot network 402 which contains Hotspot client 404. Hotspot network 402 is separate from private network 108.

Hotspot network 402 connects various hosts, servers, and clients in a manner that separates these nodes from private network 108. A non-limiting example of a Hotspot network is a publicly-accessible WiFi network that can be accessed by any customer of a certain Internet service provider.

Hotspot client 404 is any device or system that communicates with servers on public network 104, but not with hosts on private network 108. A non-limiting example of a Hotspot client is a smart phone that a guest brings to someone's house.

In this example embodiment, Hotspot network 402 is a service provided by an Internet service provider for use by its customers. Hotspot client 404 must be authorized to operate in Hotspot network 402, which will now be discussed with reference to FIG. 5.

Figure 5:
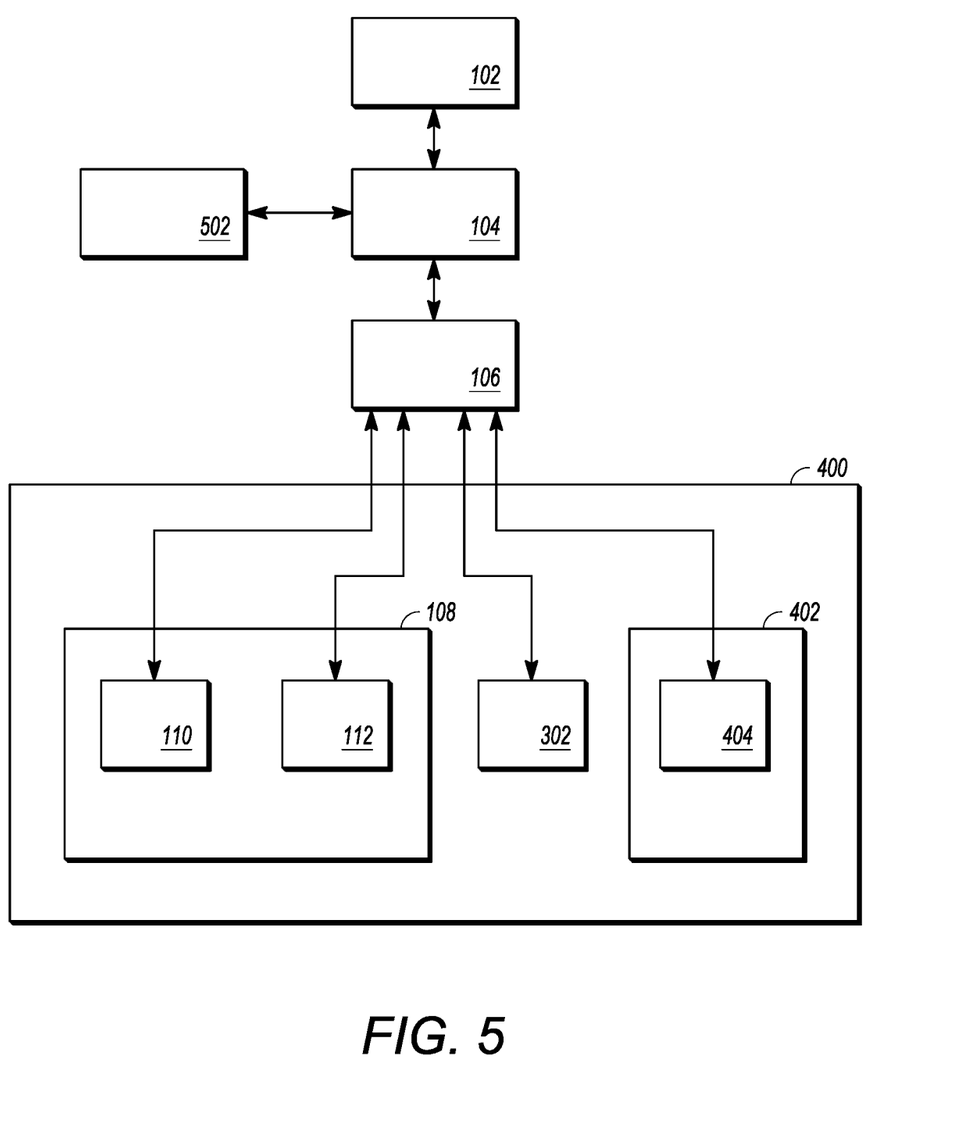
FIG. 5 illustrates a home network, a DMZ host, Hotspot client, and a Hotspot provider.

FIG. 5 illustrates home network 400 with DMZ host 302, Hotspot network 402, Hotspot client 404, and Hotspot provider 502.

Hotspot provider 502 is any device or system that authorizes Hotspot client 404 to operate in Hotspot network 402. Non-limiting examples of Hotspot provider 502 are an Internet service provider or a virtual private network provider.

In operation, a user can access public network 104 through gateway 106 by using Hotspot network 402. Hotspot network 402 is a service that is created by Hotspot provider 502. Hotspot client 404 that operates in Hotspot network 402 can access resources such as public server 102 but cannot access endpoints in private network 108, i.e. host 110, host 112, or DMZ host 302. Traffic to and from Hotspot client 404 must be routed through Hotspot provider 502 before reaching public server 102. In this example embodiment, a virtual point-to-point link is created between gateway 106 and Hotspot provider 502 using the generic route encapsulation (GRE) protocol, which will now be discussed with reference to FIG. 6.

Figure 6:
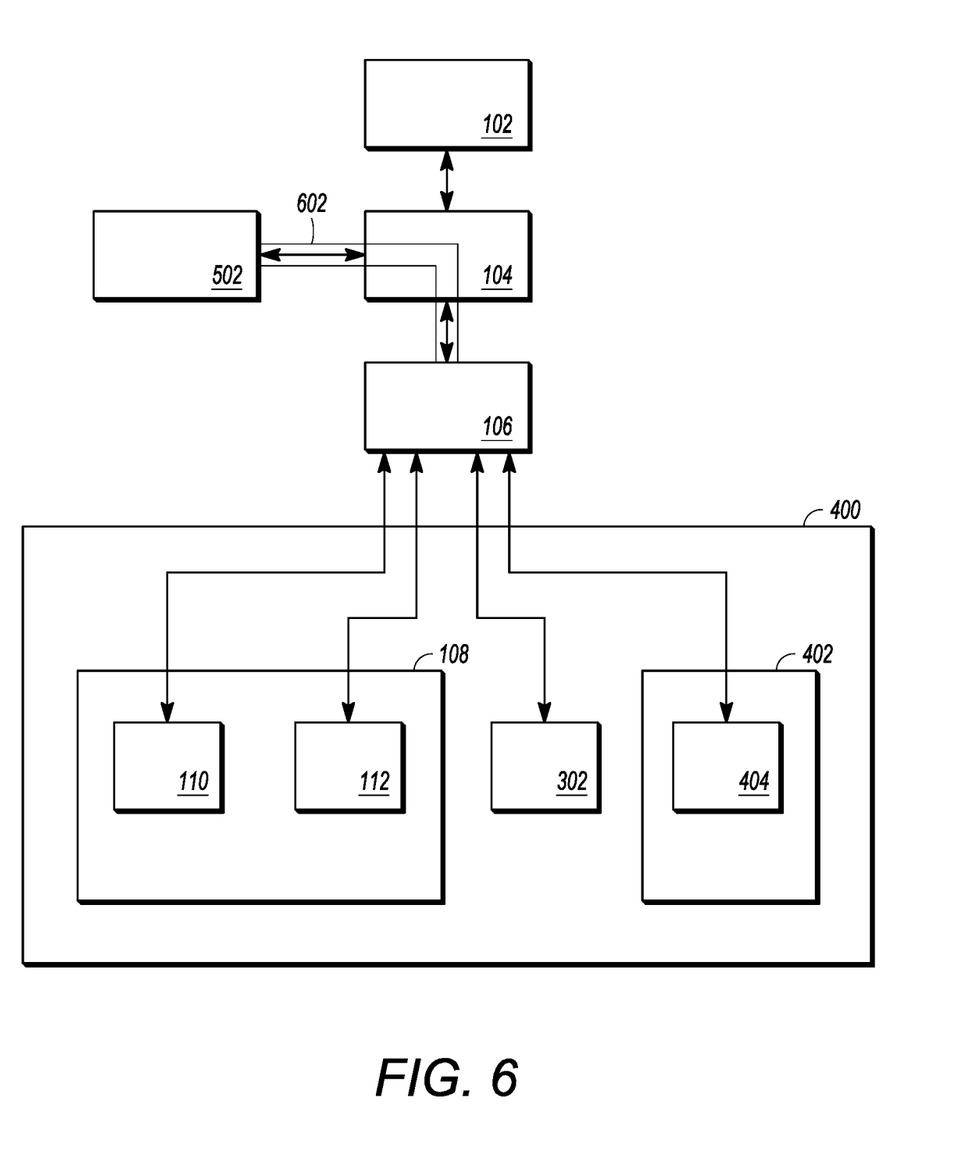
FIG. 6 illustrates a generic routing encapsulation (GRE) session that is established between a Hotspot client and a Hotspot provider.

FIG. 6 illustrates a GRE tunnel 602 that is established between Hotspot client 404 and Hotspot provider 502. GRE tunnel 602 is any system that provides a point-to-point link between two hosts using the generic route encapsulation tunneling protocol.

As shown in the figure, GRE tunnel 602 is created between gateway 106 and Hotspot provider 502.

In operation, GRE tunnel 602 forces all traffic to and from Hotspot client 404 to first pass through Hotspot provider 502. If Hotspot client 404 wants to access content from public server 102, packets from Hotspot client 404 destined for public server 102 first pass through gateway 106, through public network 104 over GRE tunnel 602, and to Hotspot provider 502. Hotspot provider 502 then routes these packets to public network 104 through routes not using GRE tunnel 602, eventually reaching public server 102.

A data packet flowing between Hotspot client 404 and public server 102 and carried through GRE tunnel 602 must contain extra information because it, in effect, travels along two overlapping networks: public network 104, which also connects to public server 102 and gateway 106, and GRE tunnel 602, which is a private link between Hotspot provider 502 and gateway 106. This will now be discussed with reference to FIG. 7.

Figure 7:
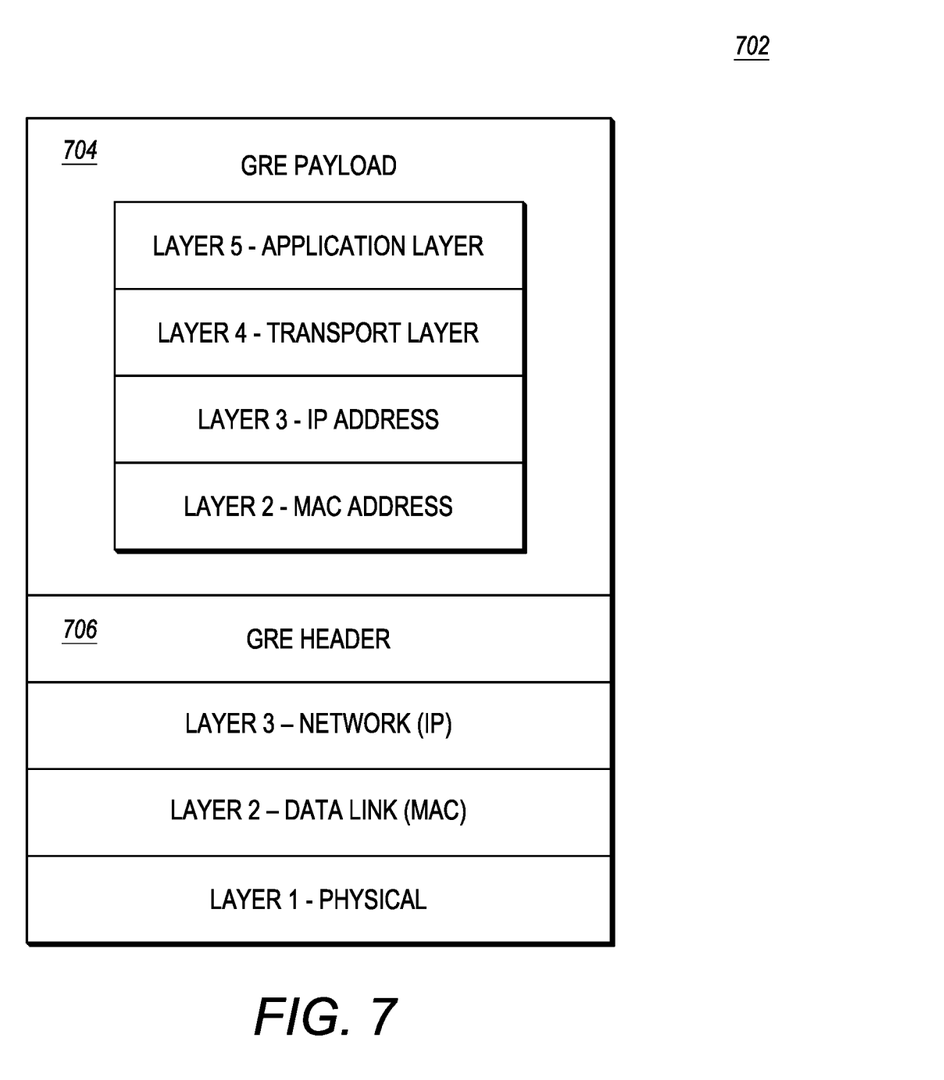
FIG. 7 illustrates a data model of a TCP/IP packet with a GRE payload.

FIG. 7 illustrates a data model of a TCP/IP packet 702 with a GRE header 706 and a GRE payload 704.

GRE payload 704 is a self-contained TCP/IP packet that is completely carried within another TCP/IP packet. GRE payload 704 is also referred to as an encapsulated packet.

GRE header 706 has a field that signals that TCP/IP packet 702 is carrying GRE payload 704.

As shown in the figure, TCP/IP packet 702 consists of several layers, similar to the structure of TCP/IP packet 202 referenced in FIG. 2. Layers 1, 2, and 3 of TCP/IP packet 702 are identical to those of TCP/IP packet 202. The next layer above, GRE header 706, signals that TCP/IP packet 702 contains GRE payload 704.

Returning to FIG. 6, Hotspot provider 502 sends TCP/IP packet 702 to Hotspot client 404. Referring to FIG. 7, there are two sets of destination Layer 2 and Layer 3 addresses. The destination Layer 2 address of the GRE payload 704 is the Layer 2 address of Hotspot client 404. The destination Layer 3 address of TCP/IP packet 702 is the Layer 3 address of gateway 106. The destination Layer 2 address of TCP/IP packet 702 is the Layer 2 address of the next node in the route, and changes as TCP/IP packet traverses the route. The last destination Layer 2 address of TCP/IP packet 702 is that of gateway 106.

Because incoming TCP/IP packet 702 has the same Layer 2 and Layer 3 information as incoming TCP/IP packet 202, gateway 106 may have difficulty deciding how to forward the packet. This will now be discussed with reference to FIGS. 8-9.

Figure 8:
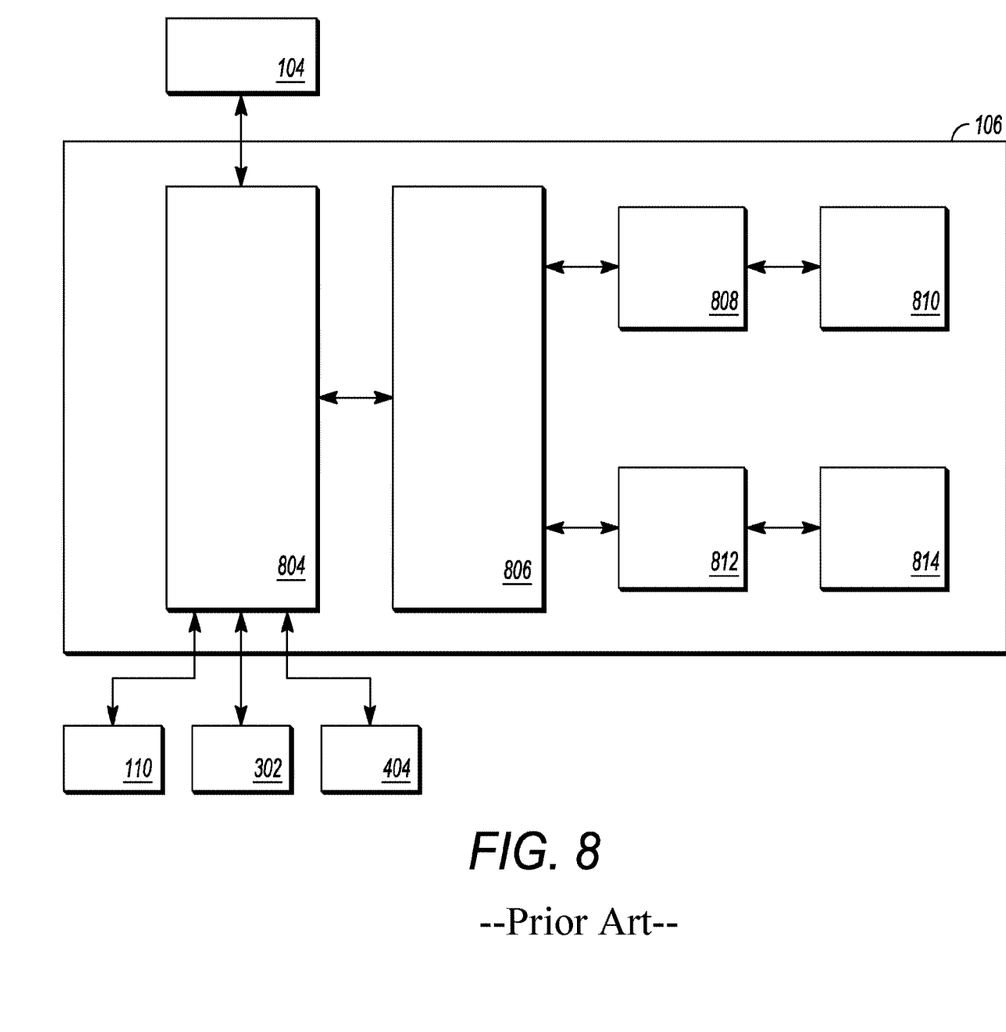
FIG. 8 illustrates a block diagram of a prior-art gateway.

FIG. 8 illustrates a block diagram of prior-art gateway 106.

As shown in the figure, gateway 106 is connected to public network 104 and to local hosts that include host 110, DMZ host 302, and Hotspot client 404.

Gateway 106 includes a communication module 804, a processing module 806, a network address translation (NAT) module 808, a connection tracking table 810, a bridging module 812, and a forwarding database (FDB) table 814.

Communication module 804 is any device or system operable to receive packets from public network 104 and forward packets to the correct local host, including DMZ host 302 and Hotspot client 404.

Processing module 806 is any device or system operable to determine how an incoming packet, including unicast and multicast packets, should be routed and to instruct communication module 804 to forward the packet to the appropriate local host. Connection tracking table 810 is any device or system operable to retain only Layer 3, and Layer 4 information of each network session established by gateway 106. For example, when host 110 establishes a session with a server in public network 104, that connection information is stored in connection tracking table 810. When another packet is sent to host 110 from public network 104, gateway 106 checks connection tracking table 810, finds the connection information, and forwards that packet to host 110.

NAT module 808 is any device or system operable to map IP addresses of hosts in private network 108 to one external IP address used by gateway 106 when communicating with public network 104. NAT module 808 uses connection tracking table 810 to keep track of individual sessions to host 110.

Bridging module 812 is any device or system operable to learn Layer 2 information of each local host attached to gateway 106, this Layer 2 information being stored in FDB table 814. Unlike connection tracking table 810, FDB table 814 does not store Layer 3 information.

A process by which gateway 106 forwards GRE and DMZ packets will now be discussed with reference to FIG. 9.

Figure 9:
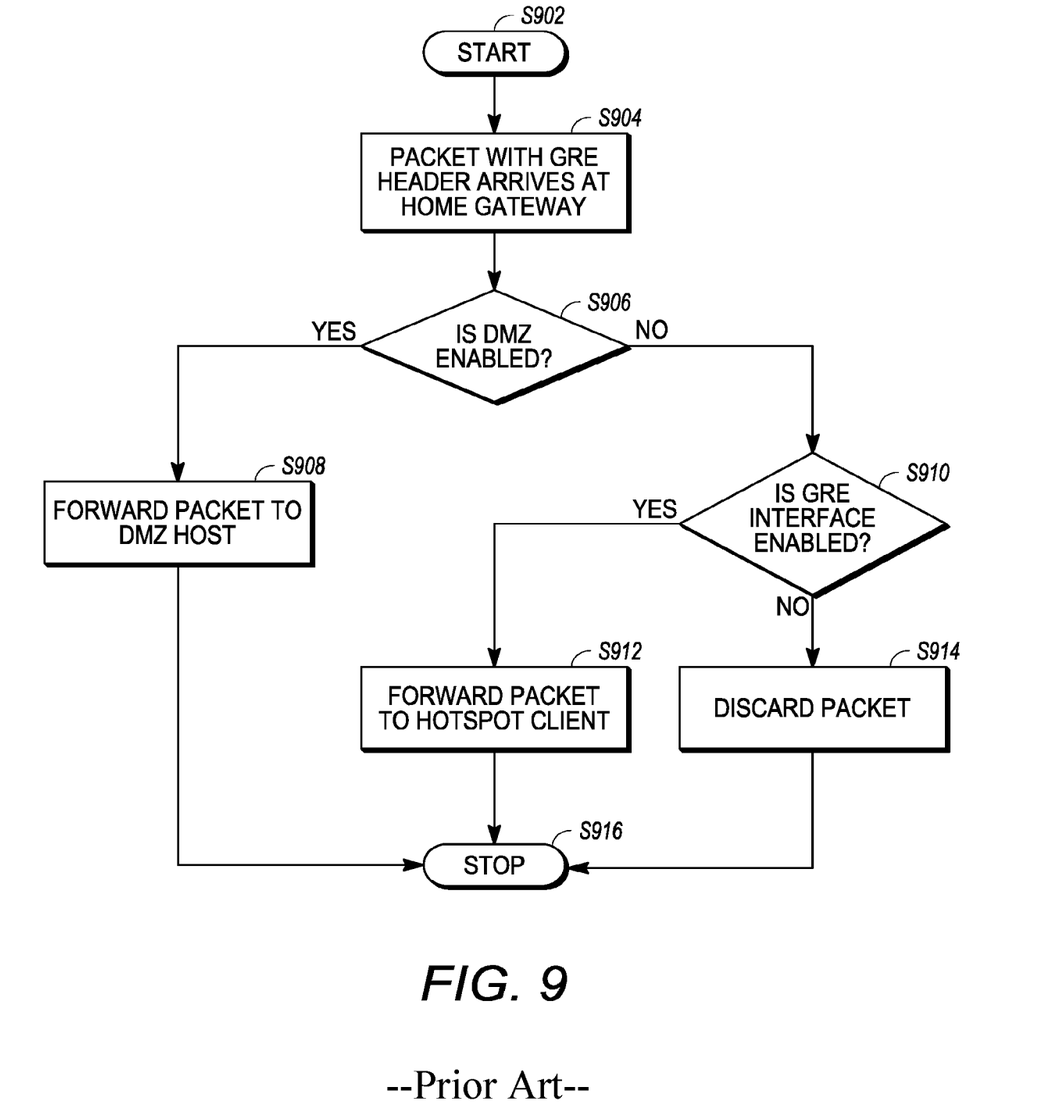
FIG. 9 illustrates a prior-art process for routing a GRE packet.

FIG. 9 illustrates a prior-art process for routing a TCP/IP packet with GRE payload, also known as a GRE packet.

Process 900 starts (S902) and a GRE packet arrives (S904). Referring to FIG. 8, this GRE packet arrives from public network 104 into gateway 106.

Returning to FIG. 9, if the DMZ function is not enabled (S906), gateway 106 checks whether the GRE interface is enabled (S910). If yes, then gateway 106 forwards the GRE packet to Hotspot client 404 (S912). Referring to FIGS. 7-8, gateway 106 finds the correct Hotspot client by having bridging module 812 check whether the Layer 2 MAC address of GRE payload 704 matches any entry in FDB table 814. If there is a match, then communications module 804 forwards the packet to Hotspot client 404.

Returning to FIG. 9, if the GRE interface is not enabled (S910) then the packet is discarded (S914).

A problem arises if the DMZ function is enabled (S906). Because the GRE packet is clearly not destined for host 110, gateway 106 by default forwards the GRE packet to DMZ host 302 (S908). Referring to FIGS. 7-8, NAT module 808 examines the lower Layer 3 IP address of TCP/IP packet 702, does not find a match in connection tracking table 810, and therefore forwards the packet to DMZ host 302. Hotspot client 404 never receives the GRE packet.

After forwarding or discarding the GRE packet, process 900 ends (S916).

Prior-art embodiments of a gateway as described in FIGS. 8-9 do not support a DMZ host and a GRE client simultaneously.

A gateway that can support a DMZ host and a GRE client simultaneously will now be discussed with reference to FIGS. 10-11 in accordance with aspects of the present invention.

Figure 10:
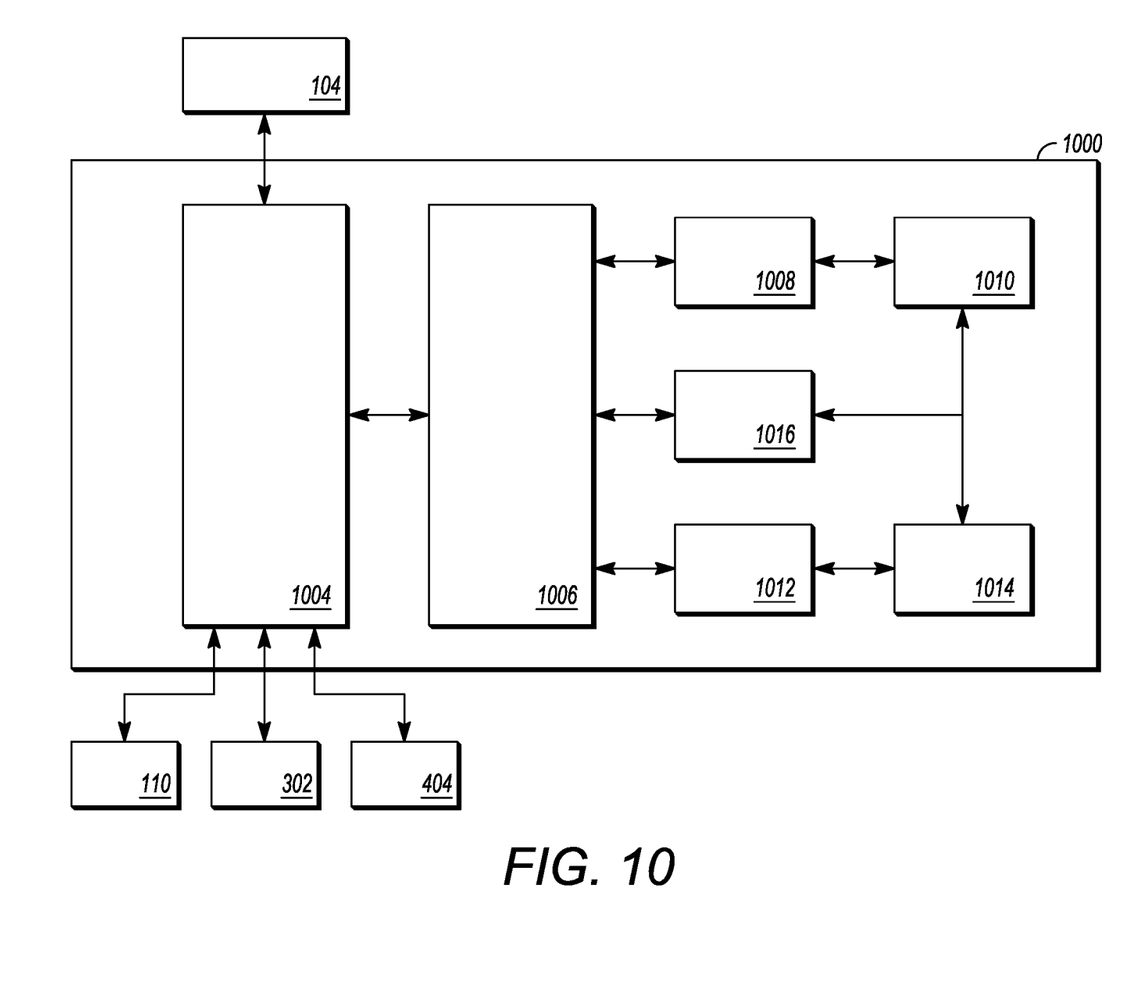
FIG. 10 illustrates a block diagram of a gateway in accordance with aspects of the present invention.

FIG. 10 illustrates a block diagram of a gateway in accordance with aspects of the present invention.

As shown in the figure, gateway 1000 is connected to public network 104 and to local hosts that include host 110, DMZ host 302, and Hotspot client 404.

Gateway 1000 includes a communication module 1004, a processing module 1006, a network address translation (NAT) module 1008, a connection tracking table 1010, a bridging module 1012, a forwarding database (FDB) table 1014, and an interconn (short for interconnection) module 1016.

Communication module 1004 is any device or system operable to receive packets from public network 104 and forward packets to the correct local host, including DMZ host 302 and Hotspot client 404.

Processing module 1006 is any device or system operable to determine how an incoming packet, including unicast and multicast packets, should be routed and to instruct communication module 1004 to forward the packet to the appropriate local host. Connection tracking table 1010 is any device or system operable to retain Layer 3, Layer 4, and other connection information of each network session established by gateway 1000. For example, when host 110 establishes a session with a server in public network 104, that connection information is stored in connection tracking table 1010. When another packet is sent to host 110 from public network 104, gateway 1000 checks connection tracking table 1010, finds the connection information, and forwards that packet to host 110.

NAT module 1008 is any device or system operable to map IP addresses of hosts in private network 108 to one external IP address used by gateway 106 when communicating with public network 104. NAT module 1008 uses connection tracking table 1010 to keep track of individual sessions to host 110.

Bridging module 1012 is any device or system operable to learn Layer 2 information of each local host attached to gateway 1000, this Layer 2 information being stored in FDB table 1014. Unlike connection tracking table 1010, FDB table 1014 does not store Layer 3 information.

Interconn module 1016 is any device or system operable to access connection tracking table 1010 and FDB table 1014.

A process by which gateway 1000 forwards GRE packets while simultaneously supporting a DMZ host will now be discussed with reference to FIG. 11.

Figure 11:
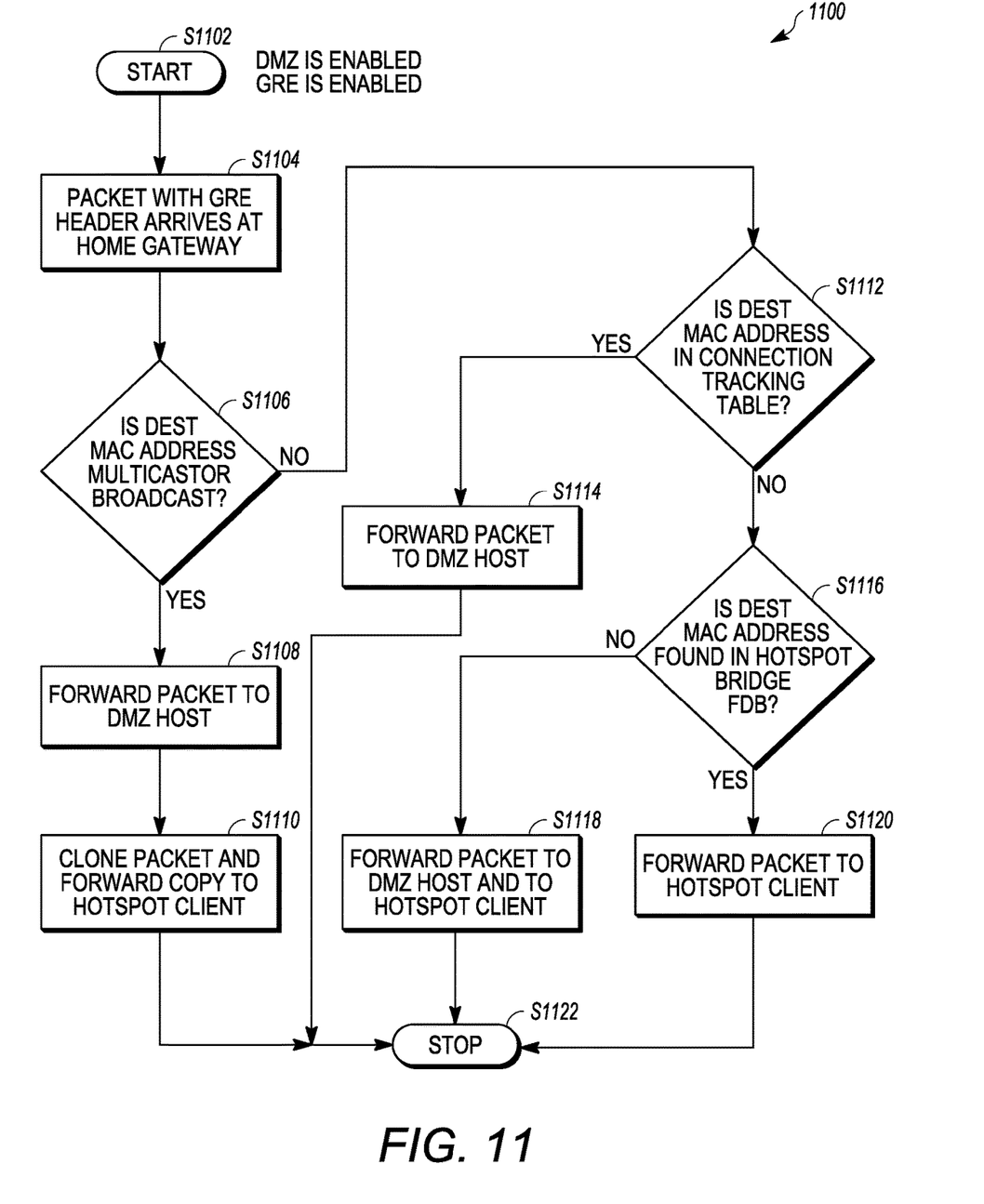
FIG. 11 illustrates a process for routing a GRE packet in accordance with aspects of the present invention.

FIG. 11 illustrates a process for routing a TCP/IP packet with GRE payload, also known as a GRE packet, in accordance with aspects of the present invention.

Process 1100 starts (S1102) and a GRE packet arrives at gateway 1000 (S1104). Gateway 1000 has enabled the DMZ and GRE functions.

Processing module 1006 checks whether the GRE packet is a multicast or broadcast packet (S1106) by examining the GRE packet's destination MAC address. In a broadcast packet, the destination address is all binary 1's; in a multicast packet, a specific bit of the destination address is a binary 1. If the GRE packet is determined to be a multicast or broadcast packet, then communication module 1004 forwards the GRE packet to all hosts, including DMZ host 302 (S1108) and Hotspot client 404 by cloning the GRE packet (S1110).

If the GRE packet is not a broadcast or multicast packet, then the GRE packet is a unicast packet that should have one destination. Prior-art gateway 106 will always route the GRE packet to DMZ host when DMZ is enabled. Referring to FIG. 9, prior-art gateway 106 does not utilize information in GRE payload 704 (S906 and S908). Referring to FIG. 7, interconn module 1016 checks destination MAC address of GRE payload 704 against connection tracking table 1010 (S1112). Referring to FIG. 10, if DMZ host 302 is also a GRE endpoint and has previously transmitted GRE packets, then gateway 1000 is already aware of that session; furthermore, when DMZ host 302 sends GRE packet out via Gateway 106, NAT module de-capsulate the GRE payload to extract the source/destination MAC address information of the packet and utilize them as content of connection tracking entry which will exist in connection tracking table 1010. If there is a match, communication module 1004 forwards the GRE packet to DMZ host 302.

Referring to FIG. 10, if Hotspot client 404 had previously sent packets through gateway 1002, then Hotspot client's Layer 2 information will exist in FDB table 1014. Returning to FIG. 11, interconn module 1016 checks whether GRE payload 704's destination MAC address matches any entry in FDB table 1014 (S1116). If there is a match, then communication module 1004 forwards the packet to Hotspot client 404 (S1120).

If there is no matching destination address in FDB table 1014, then either the destination client is unknown to gateway 1000 or the destination client does not exist. In either case, communication module 1004 forwards the packet to both DMZ host 302 and to Hotspot client 404 (S1118). A separate process, not shown here, updates connection tracking table 1010 or FDB table 1014 when it learns the MAC address of a GRE client; thus, gateway 1000 has the proper connection information the next time it encounters a packet destined for this GRE client.

After forwarding the GRE packet to the appropriate host, process 1100 ends (S1122).

Some or all of the operations set forth in FIG. 11 may be contained as a utility, program, or subprogram, in any desired computer readable storage medium, which may be a non-transitory medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices. Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above In summary, a gateway is used in a home network to provide an interface to a public network; to connect and provide security to hosts on a private network; to allow a publicly-accessible port, such as a Hotspot, that is separate from the private network; and to support a DMZ, which handles data traffic not meant for the private hosts. A conventional gateway does not allow the Hotspot and DMZ functions to operate simultaneously because of difficulties resolving the addressing information contained in the data packets.

The invention presents a gateway that allows Hotspot and DMZ functions to operate simultaneously. This gateway allows more flexibility to configure the home network and gives public access without sacrificing the ability to have a DMZ host.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A gateway for use with a home LAN network including at least one private host in a private network in the home LAN network, a Hotspot network in the home LAN network and containing a Hotspot client, and a demilitarized zone (DMZ) host separate from the Hotspot network, said gateway comprising:
- a communication module operable to receive a communication packet from a public network, the communication packet received from the public network having a transparent Ethernet bridging generic routing encapsulation header and a payload having a destination media access control (MAC) address and
- a processing module, coupled to the communication module, the processing module configured to execute program instructions to determine the communication packet received by the communication module is a Unicast communication packet based on the destination MAC address, the processing module instructing said communication module to forward the communication packet to one of the group consisting of the DMZ host in the home LAN network and the Hotspot client in the Hotspot network formed in the home LAN network, based on the destination MAC address;
- wherein, the processing module determines that the communication packet is a Multicast communication packet, and the communication module clones a copy of the Multicast communication packet and forwards the Multicast communication packet to the DMZ host in the home LAN network and forwards the Multicast communication packet to the Hotspot client in the Hotspot network formed in the home LAN network.

2. The gateway of claim 1, further comprising:
- a network address translation (NAT) module, coupled to the processing module, the NAT module having a NAT translation rule stored therein and tracking connection information of network sessions;
- a connection tracking table having destination MAC addresses associated with the network sessions including a DMZ MAC address of the DMZ host stored therein;
- a forwarding database table having Layer 2 information stored therein; and
- an Interconn Module, coupling the processing module and the connection tracking table and the forwarding database table, wherein, when the processing module determines that the communication packet is not a Multicast communication packet, the Interconn module determining whether the destination MAC address of the communication packet is in the connection tracking table,
- wherein said processing module is operable to instruct said communication module to forward the communication packet to the DMZ host when the Interconn module determines the destination MAC address is in the connection tracking table.

3. The gateway of claim 2, further comprising:
- a bridging module, disposed between the processing module and the forwarding database table, the bridging module determining whether the destination MAC address matches a Hotspot client Mac address stored in the forwarding database table,
- wherein said processing module is operable to instruct said communication module to forward the communication packet to the Hotspot client when the destination MAC address coincides with the Hotspot client MAC address.

4. The gateway of claim 3, wherein said processing module is operable to instruct said communication module to forward the communication packet to the DMZ host and the Hotspot client when a situation of the group of situations consisting of
- the DMZ MAC address has not been learned, the destination MAC address does not coincide with DMZ MAC address, and the destination MAC address does not coincide with the Hotspot client MAC address.

5. The gateway of claim 1, further comprising:
- a bridging module, coupled to the processing module, the bridging module determining whether the destination MAC address matches a Hotspot client Mac address stored in a forwarding database table,
- wherein said processing module is operable to instruct said communication module to forward the communication packet to the Hotspot client when the destination MAC address coincides with the Hotspot client MAC address.

6. The gateway of claim 5, wherein said processing module is operable to instruct said communication module to forward the communication packet to the DMZ host and the Hotspot client when a situation of the group of situations consisting of the DMZ MAC address has not been learned, the destination MAC address does not coincide with DMZ MAC address, the destination MAC address does not coincide with the Hotspot client MAC address.

7. The gateway of claim 1, wherein said communication module is operable to receive the communication packet within one of the group consisting of Internet Protocol version 4 and Internet Protocol version 6.

8. A method using a home LAN network including at least one private host in a private network in the home LAN network, a Hotspot network in the home LAN network and containing a Hotspot client, and a demilitarized zone (DMZ) host separate from the Hotspot network, said method comprising:
- receiving, via a communication module, a communication packet from a public network, the communication packet received from the public network having a transparent Ethernet bridging generic routing encapsulation header and a payload having a destination media access control (MAC)address; and
- determining, via a processing module configured to execute program instructions and coupled to the communication module, the communication packet received by the communication module is a Unicast communication packet;
- instructing, via the processing module, the communication module to forward the communication packet to one of the group consisting of the DMZ host in the home LAN network and the Hotspot client in the Hotspot network formed in the home LAN network, based on the destination MAC address;
- cloning, by the communication module, a copy of the Multicast communication packet when the processing module determines that the communication packet is a Multicast communication packet; and
- forwarding, by the communication module, the Multicast communication packet to the DMZ host in the home LAN network and the copy of the Multicast communication packet to the Hotspot client in the Hotspot network formed in the home LAN network.

9. The method of claim 8, further comprising:
- providing a network address translation (NAT) module, coupled to the processing module, the NAT module having a NAT translation rule stored therein;

providing a connection tracking table having destination MAC addresses associated with network sessions including a DMZ MAC address of the DMZ host stored therein;

tracking, by the NAT module, connection information of the network sessions;

providing forwarding a database table having Layer 2 information stored therein;

providing an Interconn Module, coupling the processing module and the connection tracking table and the forwarding database table, operable to access the connection tracking table to determine whether the destination MAC address of the communication packet is in the connection tracking table when the processing module determines that the communication packet is not a Multicast communication packet; and instructing, via the processing module, the communication module to forward the communication packet to the DMZ host when the Interconn module determines the destination MAC address coincides with the DMZ MAC address.

10. The method of claim 9, further comprising:

providing a bridging module, disposed between the processing module and the forwarding database table, the bridging module;

determining, by the bridging module, whether the destination MAC address matches a Hotspot client Mac address stored in the forwarding database table; and instructing, via the processing module, the communication module to forward the communication packet to the Hotspot client when the destination MAC address coincides with the Hotspot client MAC address.

11. The method of claim 10, further comprising instructing, via the processing module, the communication module to forward the communication packet to the DMZ host and the Hotspot client when a situation of the group of situations consisting of the DMZ MAC address has not been learned, the destination MAC address does not coincide with DMZ MAC address, and the destination MAC address does not coincide with the Hotspot client MAC address.

12. The method of claim 8, further comprising:

providing a bridging module coupled to the processing module;

determining, by the bridging module, whether the destination MAC address matches a Hotspot client Mac address stored in a forwarding database table; and instructing, via the processing module, the communication module to forward the communication packet to the Hotspot client when the destination MAC address coincides with the Hotspot client MAC address.

13. The method of claim 12, further comprising instructing, via the processing module, the communication module to forward the communication packet to the DMZ host and the Hotspot client when a situation of the group of situations consisting of the DMZ MAC address has not been learned, the destination MAC address does not coincide with DMZ MAC address, and the destination MAC address does not coincide with the Hotspot client MAC address.

14. The method of claim 8, wherein said receiving a communication packet comprises receiving, via the communication module, the communication packet within one of the group consisting of Internet Protocol version 4 and Internet Protocol version 6.

15. A non-transitory, tangible, computer-readable media having computer-readable instructions stored thereon, for use with a home LAN network including at least one private host in a private network in the home LAN network, a Hotspot network in the home LAN network and containing a Hotspot client, and a demilitarized zone (DMZ) host separate from the Hotspot network, the computer readable instructions being capable of being read by a computer and being capable of instructing the computer to perform the method comprising:

receiving, via a communication module, a communication packet from a public network, the communication packet received from the public network having a transparent Ethernet bridging generic routing encapsulation header and a payload having a destination media access control (MAC)address; and determining, via a processing module configured to execute program instructions and coupled to the communication module, the communication packet received by the communication module is a Unicast communication packet based on the destination MAC address;

instructing, via the processing module, the communication module to forward the communication packet to one of the group consisting of the DMZ host and the Hotspot client, based on the destination MAC address;

cloning, by the communication module, a copy of the Multicast communication packet when the processing module determines that the communication packet is a Multicast communication packet; and forwarding, by the communication module, the Multicast communication packet to the DMZ host in the home LAN network and the copy of the Multicast communication packet to the Hotspot client in the Hotspot network formed in the home LAN network.

16. The non-transitory, tangible, computer-readable media of claim 15, the computer readable instructions being capable of being read by a computer and being capable of instructing the computer to perform the method further comprising:

providing a network address translation (NAT) module, coupled to the processing module, the NAT module having a NAT translation rule stored therein;

providing a connection tracking table having destination MAC addresses associated with network sessions including a DMZ MAC address of the DMZ host stored therein;

tracking, by the NAT module, connection information of the network sessions;

providing forwarding a database table having Layer 2 information stored therein;

providing an Interconn Module, coupling the processing module and the connection tracking table and the forwarding database table, operable to access the connection tracking table to determine whether the destination MAC address of the communication packet is in the connection tracking table when the processing module determines that the communication packet is not a Multicast communication packet; and instructing, via the processing module, the communication module to forward the communication packet to the DMZ host when the Interconn module determines the destination MAC address coincides with the DMZ MAC address.

17. The non-transitory, tangible, computer-readable media of claim 16, the computer readable instructions being capable of being read by a computer and being capable of instructing the computer to perform the method further comprising:

providing a bridging module, disposed between the processing module and the forwarding database table, the bridging module;

determining, by the bridging module, whether the destination MAC address matches a Hotspot client Mac address stored in the forwarding database table; and instructing, via the processing module, the communication module to forward the communication packet to the Hotspot client when the destination MAC address coincides with the Hotspot client MAC address.

18. The non-transitory, tangible, computer-readable media of claim 17, the computer readable instructions being capable of being read by a computer and being capable of instructing the computer to perform the method further comprising instructing, via the processing module, the communication module to forward the communication packet to the DMZ host and the Hotspot client when a situation of the group of situations consisting of the DMZ MAC address has not been learned, and the destination MAC address does not coincide with DMZ MAC address, the destination MAC address does not coincide with the Hotspot client MAC address.

19. The non-transitory, tangible, computer-readable media of claim 15, the computer readable instructions being capable of being read by a computer and being capable of instructing the computer to perform the method further comprising:

providing a bridging module coupled to the processing module;

determining, by the bridging module, whether the destination MAC address matches a Hotspot client Mac address stored in a forwarding database table; and instructing, via the processing module, the communication module to forward the communication packet to the Hotspot client when the destination MAC address coincides with the Hotspot client MAC address.

20. The non-transitory, tangible, computer-readable media of claim 19, the computer readable instructions being capable of being read by a computer and being capable of instructing the computer to perform the method further comprising instructing, via the processing module, the communication module to forward the communication packet to both the DMZ host and the Hotspot client when a situation of the group of situations consisting of the DMZ MAC address has not been learned, the destination MAC address does not coincide with DMZ MAC address, and the destination MAC address does not coincide with the Hotspot client MAC address.

* * * * *